United States Patent
Park et al.

(10) Patent No.: US 12,278,694 B2
(45) Date of Patent: Apr. 15, 2025

(54) METHOD AND APPARATUS FOR SYNCHRONIZING SIGNALS OF SIGNAL MEASURING DEVICES

(71) Applicant: ELECTRONICS AND TELECOMMUNICATIONS RESEARCH INSTITUTE, Daejeon (KR)

(72) Inventors: Chan Ki Park, Daejeon (KR); Hyun Soon Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 17/935,456

(22) Filed: Sep. 26, 2022

(65) Prior Publication Data

US 2023/0275679 A1 Aug. 31, 2023

(30) Foreign Application Priority Data

Feb. 25, 2022 (KR) .................. 10-2022-0025240
Jul. 11, 2022 (KR) .................. 10-2022-0085018

(51) Int. Cl.
H04J 3/06 (2006.01)

(52) U.S. Cl.
CPC ............ H04J 3/0644 (2013.01); H04J 3/065 (2013.01)

(58) Field of Classification Search
CPC .......... H04L 27/2679; H04L 5/1492; H04L 27/2662; H04L 69/28; H04L 5/0035; H04L 5/0055; H04L 5/0057; H04L 12/2869; H04L 12/5695; H04L 47/00; H04L 47/70; H04L 47/78; H04L 47/821; H04L 47/827; H04J 3/0667; H04W 72/04
See application file for complete search history.

(56) References Cited

U.S. PATENT DOCUMENTS

| | | | | |
|---|---|---|---|---|
| 7,058,152 | B2* | 6/2006 | Long | H04L 27/2662 375/294 |
| 7,095,707 | B2* | 8/2006 | Rakib | H04N 7/17309 370/204 |
| 7,239,650 | B2* | 7/2007 | Rakib | H04L 5/026 370/480 |
| 7,298,221 | B2* | 11/2007 | Yan | H03L 7/093 331/16 |
| 7,430,261 | B2* | 9/2008 | Forest | H04L 12/417 375/364 |
| 8,467,309 | B2* | 6/2013 | Chan | G01S 5/14 455/456.2 |
| 9,128,172 | B2* | 9/2015 | Chan | G01S 5/06 |

(Continued)

FOREIGN PATENT DOCUMENTS

| | | | |
|---|---|---|---|
| KR | 10-1993-0020886 A | 10/1993 | |
| KR | 10-1999-0072166 A | 9/1999 | |

(Continued)

*Primary Examiner* — Jung Liu (57) ABSTRACT

Disclosed herein to a method and apparatus for synchronizing signals. According to an embodiment of the present disclosure, there is provided a method for synchronizing a signal. The method comprising: receiving a reference time and performing time synchronization with the reference time; calculating a clock frequency of a system clock based on the reference time; and generating a sampling clock by using the calculated clock frequency of the system clock and a preset sampling frequency.

14 Claims, 7 Drawing Sheets

(56) References Cited

U.S. PATENT DOCUMENTS

| | | | | |
|---|---|---|---|---|
| 9,344,265 | B2* | 5/2016 | Karnes | H04L 12/4641 |
| 11,070,488 | B2* | 7/2021 | You | H04L 47/785 |
| 2001/0046266 | A1* | 11/2001 | Rakib | H04N 7/10 |
| | | | | 375/259 |
| 2004/0090962 | A1* | 5/2004 | Forest | H04L 12/44 |
| | | | | 370/442 |
| 2004/0196938 | A1* | 10/2004 | Long | H04L 27/2679 |
| | | | | 375/371 |
| 2006/0197611 | A1* | 9/2006 | Yan | H03L 7/193 |
| | | | | 331/16 |
| 2009/0086764 | A1* | 4/2009 | Lee | H04L 69/28 |
| | | | | 370/503 |
| 2013/0051381 | A1* | 2/2013 | Bracha | H04W 84/18 |
| | | | | 370/338 |
| 2016/0112182 | A1* | 4/2016 | Karnes | G06F 1/14 |
| | | | | 375/362 |
| 2019/0052227 | A1* | 2/2019 | Tröger | H04L 27/2695 |
| 2021/0273736 | A1* | 9/2021 | Li | H04W 76/12 |
| 2024/0205053 | A1* | 6/2024 | Andree | H04J 13/0077 |

FOREIGN PATENT DOCUMENTS

| | | |
|---|---|---|
| KR | 10-0629315 B1 | 9/2006 |
| KR | 10-1067768 B1 | 9/2011 |
| KR | 10-1261123 B1 | 5/2013 |
| KR | 10-1434514 B1 | 8/2014 |
| KR | 10-2018-0121894 A | 11/2018 |
| KR | 10-2181029 B1 | 11/2020 |
| KR | 10-2300967 B1 | 9/2021 |

\* cited by examiner

FIG. 1

Clock signal of system A

Clock signal of system B

Frequency synchronization (a)

Clock signal of system A

Clock signal of system B

Phase synchronization (b)

METHOD AND APPARATUS FOR SYNCHRONIZING SIGNALS OF SIGNAL MEASURING DEVICES

CROSS REFERENCE TO RELATED APPLICATION

The present application claims priority to Korean patent applications 10-2022-0025240, filed Feb. 25, 2022, and 10-2022-0085018, filed Jul. 11, 2022, the entire contents of which are incorporated herein for all purposes by this reference.

BACKGROUND OF THE INVENTION

Field of the Invention

The present disclosure relates to a method and apparatus for synchronizing signals, and more particularly, to a method and apparatus for synchronizing signals of a plurality of independent signal measuring devices.

Description of the Related Art

Various signal measuring devices like smart phones and smart watches are being used in our daily lives. There is an increasing demand for integrating and processing multiple signals that are measured simultaneously from a plurality of independent devices. Typical examples are a camera and a microphone for measuring in a broadcast. Due to environmental restrictions and signal quality, image and voice signals need to be measured not in a single device but in multiple independent cameras and microphones, and signals measured in such independent devices are basically asynchronous with each other, which makes it necessary to perform an additional post-processing synchronization.

Signals measured from independent devices are asynchronous because the independent devices operate based on independent system clocks and each of the devices recognizes different times. Even devices manufactured through a same process have different frequencies of system clocks, and even when the difference between frequencies is slight, as the measuring time of signals increases, the different becomes significant. For the same reason, no accurate digital clock can be operated without a periodical synchronization process of satellite time.

SUMMARY

The present disclosure is technically directed to provide a method and apparatus for synchronizing signals of a plurality of independent signal measuring devices.

Other objects and advantages of the present invention will become apparent from the description below and will be clearly understood through embodiments. In addition, it will be easily understood that the objects and advantages of the present disclosure may be realized by means of the appended claims and a combination thereof.

Disclosed herein to a method and apparatus for synchronizing signals. According to an embodiment of the present disclosure, there is provided a method for synchronizing a signal. The method comprising: receiving a reference time and performing time synchronization with the reference time; calculating a clock frequency of a system clock based on the reference time; and generating a sampling clock by using the calculated clock frequency of the system clock and a preset sampling frequency.

According to the embodiment of the present disclosure, the method further comprising synchronizing a phase of the generated sampling clock at a preset phase synchronization time point.

According to the embodiment of the present disclosure, wherein the synchronizing of the phase of the generated sampling clock receives the phase synchronization time point from a master device, which provides the reference time, and synchronizes the phase of the sampling clock at the received phase synchronization time point.

According to the embodiment of the present disclosure, wherein the synchronizing of the phase of the generated sampling clock synchronizes the phase of the sampling clock through resetting a counter, which generates the sampling clock, at the phase synchronization time point.

According to the embodiment of the present disclosure, wherein the performing of the time synchronization performs the time synchronization by receiving, from a master device, a time of the master device as the reference time.

According to the embodiment of the present disclosure, wherein the calculating of the clock frequency of the system clock calculates, based on a preset unit time interval, a clock number of the system clock in the unit time interval and calculates the clock frequency of the system clock by using the calculated clock number.

According to another embodiment of the present disclosure, there is provided an apparatus for synchronizing a signal. The apparatus comprising: a communication unit; and a controller, wherein the controller is configured to: perform time synchronization with a reference time received through the communication unit, calculate a clock frequency of a system clock based on the reference time, and generate a sampling clock by using the calculated clock frequency of the system clock and a preset sampling frequency.

According to another embodiment of the present disclosure, there is provided a system for synchronizing a signal. The system comprising: a master device configured to provide a reference time; and a plurality of slave devices, wherein each of the slave devices is configured to: perform time synchronization with a reference time received through the master device, calculate a clock frequency of a system clock based on the reference time, and generate a sampling clock by using the calculated clock frequency of the system clock and a preset sampling frequency.

The features briefly summarized above with respect to the present disclosure are merely exemplary aspects of the detailed description below of the present disclosure, and do not limit the scope of the present disclosure.

According to the present disclosure, it is possible to provide a method and apparatus for synchronizing signals of a plurality of independent signal measuring devices.

Effects obtained in the present disclosure are not limited to the above-mentioned effects, and other effects not mentioned above may be clearly understood by those skilled in the art from the following description.

DETAILED DESCRIPTION OF THE INVENTION

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

Figure 1:
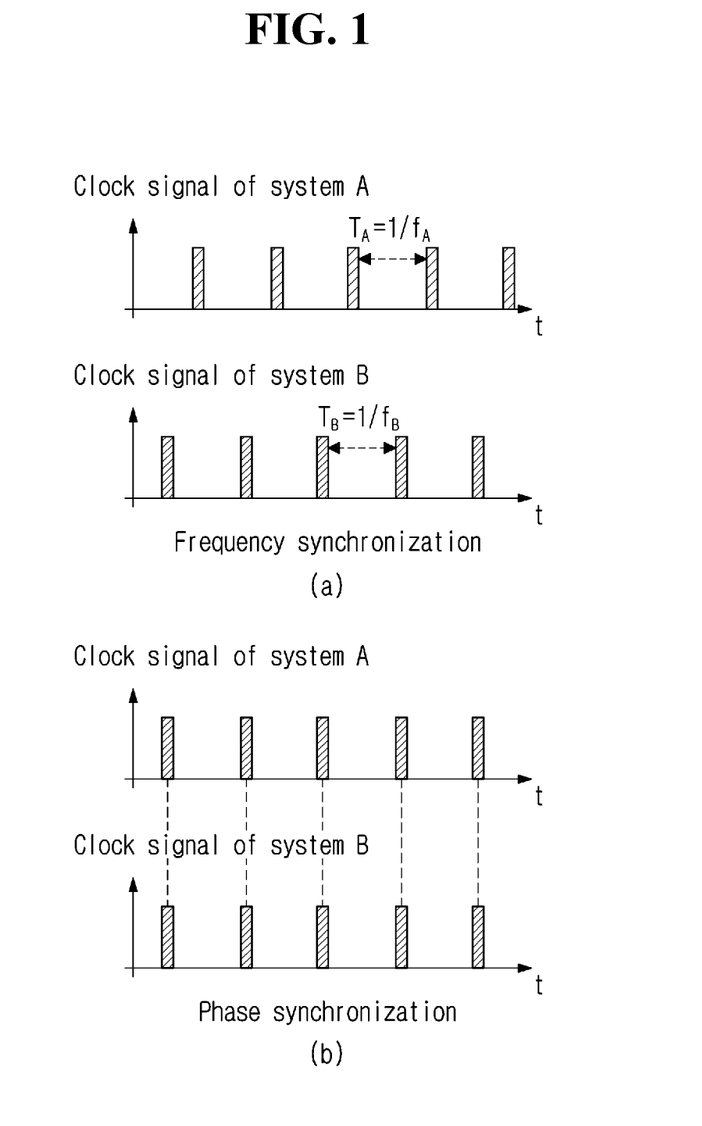
FIG. 1 is a view illustrating an example for clock frequency synchronization and phase synchronization.
Figure 2:
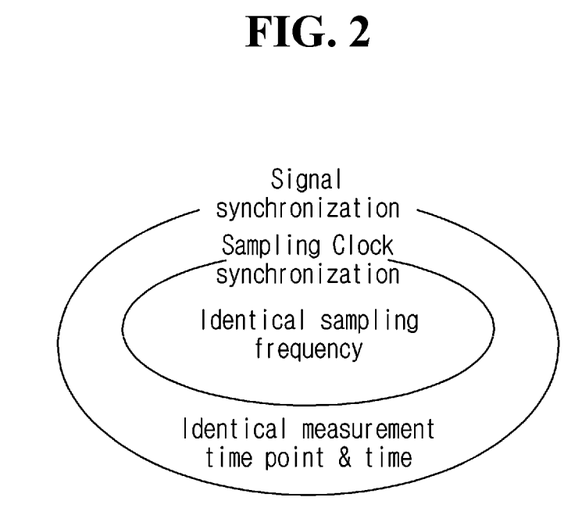
FIG. 2 is a view illustrating an example for signal sampling synchronization and sampling clock synchronization.

Basically, a clock synchronization process may consist of (a) frequency synchronization and (b) phase synchronization, as illustrated in FIG. 1. A system clock cannot be controlled, but a clock used for signal sampling may be controlled. Herein, as illustrated in FIG. 2, signal synchronization and sampling clock synchronization are different concepts.

In a signal sampling process, a sampling clock with a desired low frequency to be measured is made by using a counter for a system clock with a high frequency, and a signal is sampled according to the sampling clock. Normally, an MCU is capable of controlling a precise period with a plurality of prescaler counters embedded in it. For example, an ARM cortex M series generates a sampling clock at a desired sampling frequency through a 16 bit prescaler counter and a 32 bit auto-reload counter.

As each signal measuring device is likely to have a different desired sampling frequency, synchronization of a sampling clock and signal sampling synchronization are not the same. For example, when desired sampling frequencies for voice and image are 20,000 Hz and 60 Hz respectively, if actual sampling clocks have frequencies of 20,200 Hz and 60.6 Hz respectively, clock synchronization is not achieved, but signal sampling synchronization is achieved. Signal sampling synchronization between independent devices means that measurement time point and measurement time are identical between the respective devices.

Synchronization has become a critical issue in various fields. As for manufacturing a media image, an error of several ms is not recognized by viewers, but that of dozens to hundreds ms is recognizable. In the case of multiple biometric signal measurements, for example, P300 brainwave, blood press estimation and pulse transit time, an error of several ms causes no serious problem to a multiple biometric signal analysis, but that of dozens to hundreds ms may cause a significant mistake in a signal analysis. In an actual application, a synchronization error within several ms is permissible.

An existing synchronization method for signals measured by independent devices (or apparatuses) includes an additional synchronization work by taking an editing point (measurement time point and time), for example, a slate in a film or broadcast. As a voice signal can be resampled through interpolation, synchronization becomes very simple when an accurate editing point is known. Herein, resampling is a process of estimating a synchronous signal, not sampling an original signal again. In other words, the accuracy of a resampled signal may be lowered even to a slight extent. Furthermore, since an additional post-processing (batch processing) synchronization work is necessary, the problem is that efficiency is lowered and an application is difficult to use in real time.

Various techniques for synchronizing time between devices have been proposed. The precision time protocol (IEEE 1599), which is a representative one, is a technique of synchronizing time between a master device and a slave device. This technique enables precise time synchronization with an error of several ms and below at a synchronization time point but long-term signal sampling synchronization is not possible.

Another conventional technique shared a sampling clock or trigger as a scheme for sampling synchronization. Such a clock or trigger sharing scheme is hardly applicable to a case in which devices desire different sampling frequencies, and due to propagation delay in wired communication and latency in wireless communication, accurate sharing of a sampling clock and a trigger is unstably obtained. Even when a trigger signal is accurate, constant sampling clock or trigger sharing is very redundant. These problems of inaccuracy and low efficiency are greater in wireless communication than in wired communication and, in wireless communication, become greater as the communication distance increases.

In embodiments of the present disclosure, the main idea is to perform signal synchronization of independent devices without a separate post-processing process, for example, signal sampling synchronization.

Herein, in embodiments of the present disclosure, signals of a plurality of independent devices may be synchronized by controlling a counter that generates sampling clocks of independent devices.

In embodiments of the present disclosure, signal sampling synchronization devices may be distinguished into a master device, which issues a command, and a plurality of slave devices that execute synchronization according to the command.

Figure 3:
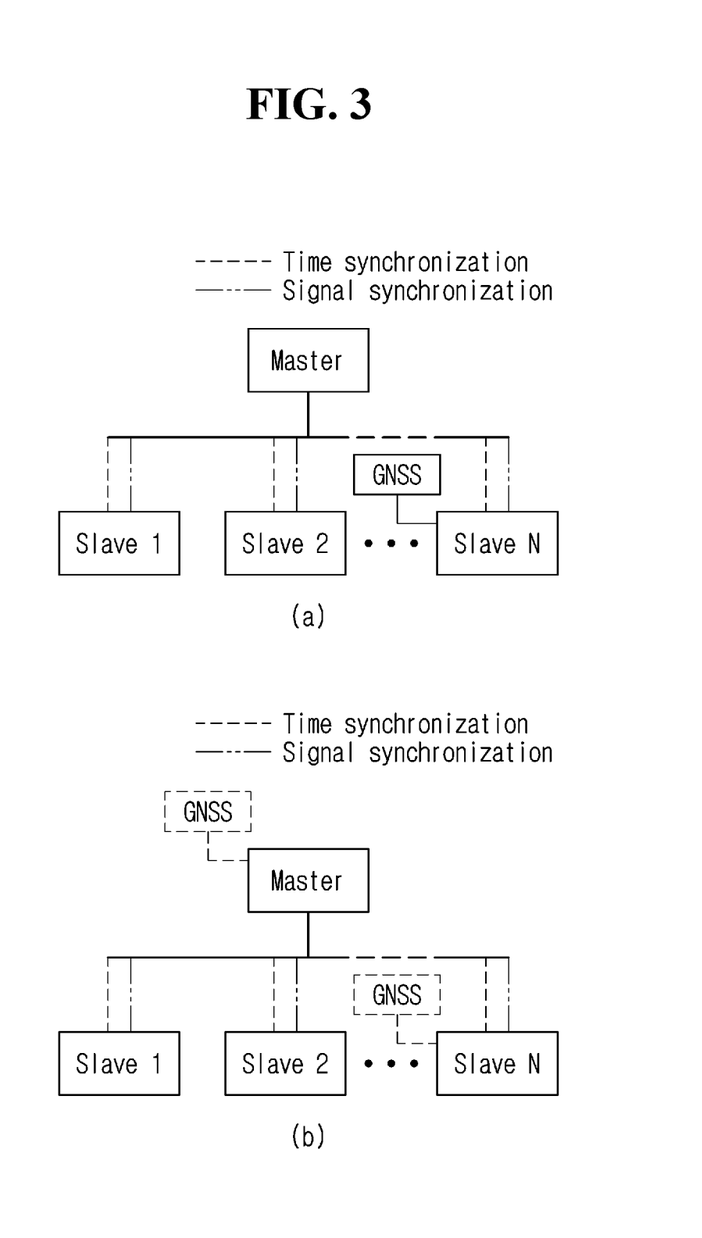
FIG. 3. is a view illustrating a structure of a signal synchronization system according to an embodiment of the present disclosure.

FIG. 3 illustrates a structure of a signal synchronization system according to an embodiment of the present disclosure, showing a structure for (a) a case in which a master device has no GNSS receiver, and (b) a case in which a master device has a GNSS receiver.

As illustrated in FIG. 3, a signal synchronization system according to an embodiment of the present disclosure includes a master device and a plurality of slave devices (Slave 1, . . . , Slave N) and performs time synchronization and signal sampling synchronization depending on whether or not a GNSS (Global Navigation Satellite Systems) receiver is installed, that is, whether or not a satellite reception time is available.

In synchronization, as illustrated in FIG. 3A, in case no satellite reception time is available as when no GNSS receiver is installed, a master device may use a time of its own system clock as a reference time of a signal synchronization system, and as illustrated in FIG. 3B, in case a GNSS receiver is installed, a satellite reception time of the GNSS receiver may be used as the reference time of the signal synchronization system. In case a GNSS receiver is installed both in a master device and in slave devices, a signal sampling synchronization process may be performed based on a satellite reception time of the GNSS receiver without a separate time synchronization process, and otherwise, a slave device performs time synchronization with the master device. Herein, time synchronization may use the precision time protocol (PTP) (IEEE 1599).

That is, a time synchronization system according to an embodiment of the present disclosure may synchronize the time of each slave device with that of a system clock of a master device in order to use the time for the system clock of the master device as a reference time. Of course, as described above, a master device may be equipped with a GNSS receiver or not be equipped with a GNSS receiver, and a system clock of the master device may be used as a reference time irrespective of whether or not a GNSS receiver is used. Even when a slave device is equipped with a GNSS receiver, the slave device may use time of a master device as a reference time through time synchronization with a system clock of the master device.

In an embodiment of the present disclosure, a master device may be a device for measuring a signal with signal synchronization with slave devices or be a control device for providing, to slave devices, information on a reference time and a phase synchronization time point in which phase synchronization of a sampling clock of slave devices is performed. Of course, a master device is not restricted or limited to a device for performing the above-described function but may include every kind of devices applicable to the method, apparatus and system of the present disclosure.

Each slave device (Slave 1, . . . , Slave N) may calculate a clock frequency of a system clock by using a reference time based on time synchronization with a master device, generate a sampling clock with a sampling frequency desired by each slave device by using the calculated clock frequency of the system clock and then perform phase synchronization of the generated sampling clock at a phase synchronization time point.

Accordingly, since a sampling clock with a desired sampling frequency is accurately generated and phase synchronization of the sampling clock is performed at a phase synchronization time point, each slave device may synchronize the sampling clock with another device without a separate post-processing process.

Such a signal synchronization device will be described with reference to FIG. 4 and FIG. 5.

Figure 4:
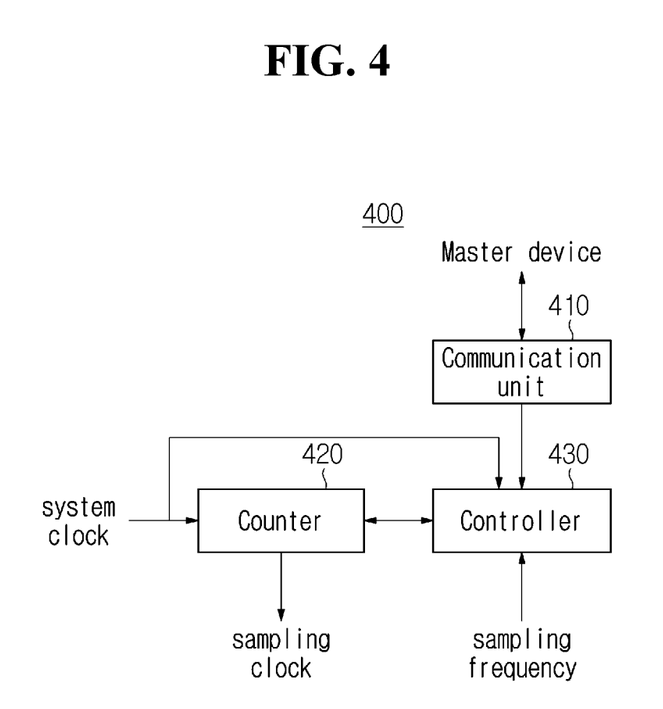
FIG. 4 is view illustrating a configuration of a signal synchronization device according to another embodiment of the present disclosure.

FIG. 4 is view illustrating a configuration of a signal synchronization device according to another embodiment of the present disclosure, and this view shows a configuration for a master device or a slave device. The description herein assumes that the configuration is for a signal synchronization device of a slave device.

Referring to FIG. 4, a signal synchronization device 400 according to another embodiment of the present disclosure includes a communication unit 410, a counter 420, and a controller 430. Of course, a master device or a slave device may include not only a configuration means constituting the signal synchronization device but also every configuration means necessary for the device, for example, a configuration means for a memory, an interface device and the like.

As a configuration means performing communication with a master device, the communication unit 410 receives a system clock of the master as a reference time in order to perform time synchronization with the system clock of the master device and receives phase synchronization time point reservation information for phase synchronization of a sampling clock. Of course, when the master device has a signal synchronization device, the communication unit 410 may perform communication with each slave device.

According to an embodiment, when the master device has a GNSS receiver, the communication unit 410 may receive a satellite reception time of the GNSS receiver, or when the master device has not GNSS receiver, the communication unit 410 may receive information on a time of a system clock of the master device.

By control of the controller 430, the counter 420 generates a sampling clock, which corresponds to a desired sampling frequency, by using a system clock of a slave device.

The controller 430 is configured to perform time synchronization with a master device by using a reference time received through the communication unit 410, to calculate a clock frequency of a system clock based on the reference time, to control the counter 420 by using the calculated clock frequency of the system clock and a preset desired sampling frequency, and to generate a sampling clock corresponding to the desired sampling frequency.

Herein, the controller 430 may calculate a clock number of a system clock in a preset unit time interval, for example, based on one second, and clearly calculate a clock frequency of the system clock by using the calculated clock number. That is, by calculating a clock frequency by using a clock number of a system clock in a unit time interval, the controller 430 may clearly calibrate an error of a system clock frequency that is likely to occur according to a product. Accordingly, the controller 430 may remove an error of a sampling clock, which may occur due to an error of a system clock frequency, and thus generate a sampling clock corresponding to a desired sampling frequency.

Furthermore, according to phase synchronization time point reservation information that is received from a master device through the communication unit 410, the controller 430 synchronizes a phase of a sampling clock at a phase synchronization time point.

Herein, by synchronizing a phase of a sampling clock through resetting the counter 420 at a phase synchronization time point, the controller 430 may synchronize the phase of the sampling clock not only with a master device but also with other slave devices.

Such an operation of the signal synchronization device 400 will be further described below with reference to FIG. 5.

Figure 5:
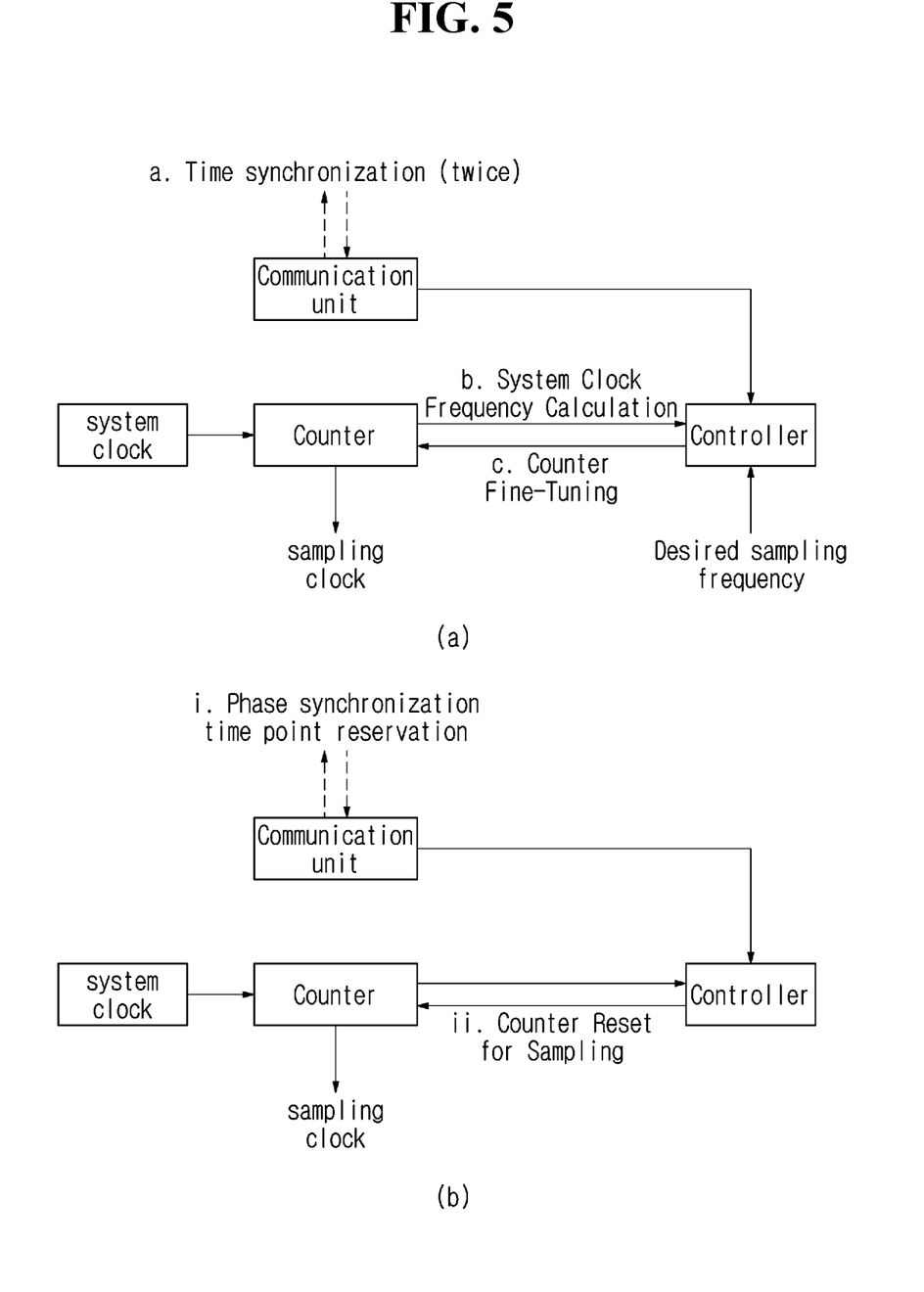
FIG. 5 is an example view for describing an operation of the signal synchronization device of FIG. 4.

FIG. 5 is an example view for describing an operation of the signal synchronization device of FIG. 4, FIG. 5A is an example view for describing a frequency synchronization process, and FIG. 5B is an example view for describing a phase synchronization process.

A signal sampling synchronization process consists of a frequency synchronization process and a phase synchronization process, and the frequency synchronization process can be described as follows with reference to FIG. 5A.

As illustrated in FIG. 5A, in the frequency synchronization process, (a) time synchronization is performed twice at two different time points, for example, at the start time and end time of a preset unit time interval, and (b) the number of a system clock is calculated and a clock frequency of an actual system is calculated between the two synchronization time points. That is, the controller calculates a clock frequency of an actual system by calculating the number of a system clock within a unit time interval through time synchronization performed twice. In addition, (c) a sampling clock corresponding to a desired sampling frequency is generated by fine-tuning a counter for a system clock and a counter for a sampling clock from a clock frequency of a system.

In case both a master device and a slave device have a GNSS receiver embedded in them, frequency synchronization may be performed using a pulse per second (PSS) signal without a separate time synchronization process. In this case, an interval between synchronization time points may be a preset time, for example, one second. On the other hand, in case there is no GNSS receiver, since a system time of a master device becomes the criterion of synchronization, the master device may require only the time synchronization process described in (a) but not the subsequent frequency synchronization process described in (b) and (c) above.

The phase synchronization process can be described as follows with reference to FIG. 5B.

As illustrated in FIG. 5B, in the phase synchronization process, (i) a phase synchronization time point is reserved through communication between a master device and a slave device. Herein, after the reservation, the synchronization time point may be recognized by using a satellite reception time or a system clock of each device. (ii) Each device, for example, the master device and each of a plurality of slave devices may generate a sampling clock through resetting a counter for the sampling clock at the phase synchronization time point, thereby performing the phase synchronization process for the sampling clock.

Since a time point of synchronizing with a slave device cannot be known to the master device due to the propagation delay and latency in communication, a phase synchronization time point is reserved and then a phase synchronization process is performed in each device. When phase synchronization is performed in this manner, the propagation delay and latency of communication are not influential so that synchronized devices are not restricted to a distance between them. Herein, the phase synchronization process may be performed with a signal measurement start command.

As a sampling clock is controlled based on a synchronized reference time, synchronization is possible even when two devices have different desired frequencies, for example, 20,000 Hz and 60 Hz. Fine-tuning of a counter may be controlled through selection of a prescaler counter, a change of auto-reload register value and the like. Phase synchronization for two devices has been described, but the present disclosure is not restricted or limited thereto, and phase synchronization of a plurality of devices, for example, slave devices or between a master device and slave devices may be performed through the above-described process.

Although the above process is described to be performed in a slave device, it may also be performed in a master device. That is, time synchronization process is not performed in a master device, but it is possible to perform a process of calculating a system clock frequency and generating a sampling clock with a desired sampling frequency by using the calculated system clock frequency and a process for phase synchronization between the generated sampling clock and a sampling clock of slave devices.

Thus, a phase synchronization system or device according to embodiments of the present disclosure may perform signal synchronization of independent devices, for example, signal sampling synchronization without a separate post-processing process.

In addition, when satellite reception time information of a GNSS receiver is available, since synchronization of sampling frequency is possible without communication between a master device and a slave device, a phase synchronization system or device according to embodiments of the present disclosure may be used for calibration of a sampling frequency of a stand-alone device, and time synchronization necessary for a signal sampling synchronization process (e.g., precision time protocol (IEEE 1599)), utilization of satellite reception time of a GNSS receiver, and a phase synchronization process may not be influenced by a distance between devices.

The conventional signal synchronization techniques use synchronization by post-processing after signal measurement and share of a sampling clock, and the synchronization by post-processing after signal measurement has the problem of inefficient post-processing, and the share of a sampling clock has the problem that an unstable sampling clock should be constantly transmitted and received. Specifically, the share of a sampling clock is difficult to perform synchronization when sampling frequencies of signals are different, for example, there are different sampling frequencies of 20,000 Hz and 60 Hz. On the other hand, a phase synchronization system or device according to embodiments of the present disclosure has time information shared between independent terminals or devices and thus enables efficient and stable signal synchronization without an inefficient post-processing process and unstable sharing of a clock, and it has great advantages that, even when sampling frequencies of signals are different, synchronization may be performed without problem and a distance between measuring devices is not influential. The above-described advantages of stability and efficiency appear to be much more remarkable in a wireless environment, and when every device is capable of receiving satellite GNSS, synchronization may be performed very accurately.

Figure 6:
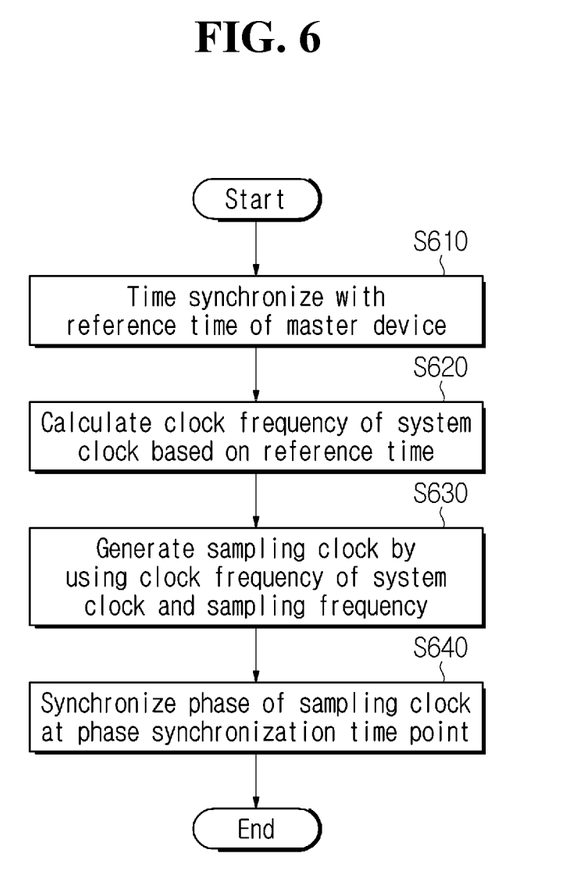
FIG. 6 is a flowchart of an operation of a signal synchronization method according to another embodiment of the present disclosure.

FIG. 6 is a flowchart of an operation of a signal synchronization method according to another embodiment of the present disclosure, and this flowchart shows an operation of a device in FIG. 1 to FIG. 5. Hereinafter, the flowchart will describe an operation of a slave device.

Referring to FIG. 6, a signal synchronization method according to another embodiment of the present disclosure performs time synchronization with a reference time of a master device and calculates a clock frequency of a system clock used in the device based on the reference time of the time synchronization (S610, S620).

Herein, the step S610 may be skipped when both the master device and a slave device have a GNSS receiver, and the process may be performed when the master device has no GNSS receiver or the slave device has no GNSS receiver.

The reference time of step S610 may mean a time of a system clock in the master device, and when there is a GNSS receiver, it may be a satellite reception time.

At step S620, a clock number of the system clock of the device may be calculated or detected by performing time synchronization twice for a preset time unit, for example, start and end time points of one second, and a clock frequency of the system clock may be calculated by using the clock number of the system clock in the unit time interval.

When the clock frequency of the system clock is calculated at step S620, a sampling clock with a desired sampling frequency is generated by controlling a counter by means of the calculated clock frequency of the system clock and a sampling frequency desired at a slave device (S630).

When the sampling clock with the desired sampling frequency is generated at step S630, phase synchronization of the sampling clock is performed at a preset phase synchronization time point, for example, a phase synchronization received from the master device (S640).

Herein, at step S640, as the counter is reset at the phase synchronization time point and then the phase of the sampling clock is synchronized, the phase of the sampling clock may be synchronized not only with the master device but also with other slave devices.

Although not described in the method of FIG. 6, a method according to an embodiment of the present disclosure may include all the contents described in a device and system of FIG. 1 to FIG. 5, which is apparent to those who have skill in the art.

Figure 7:
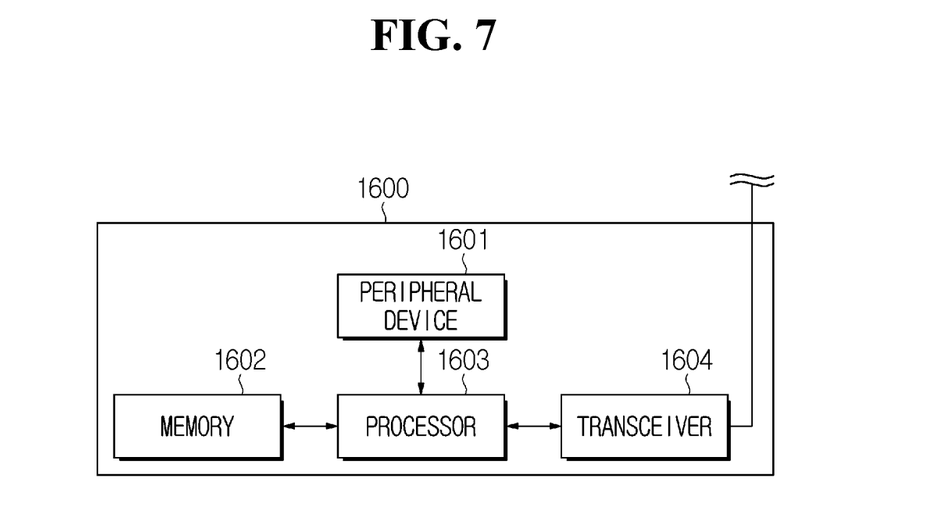
FIG. 7 is a view illustrating a device configuration to which a signal synchronization device according to another embodiment of the present disclosure is applicable.

FIG. 7 is a view illustrating a device configuration to which a signal synchronization device according to another embodiment of the present disclosure is applicable.

The signal synchronization device according to an embodiment of the present disclosure of FIG. 4 may be a device 1600 of FIG. 7. Referring to FIG. 7, the device 1600 may include a memory 1602, a processor 1603, a transceiver 1604 and a peripheral device 1601. In addition, for example, the device 1600 may further include another configuration and is not limited to the above-described embodiment. Herein, for example, the device 1600 may be a mobile user terminal (e.g., a smartphone, a laptop, a wearable device, etc.) or a fixed management device (e.g., a server, a PC, etc.).

More specifically, the device 1600 of FIG. 7 may be an exemplary hardware/software architecture such as a signal measurement device, an image photographing device and an audio recording device. Herein, as an example, the memory 1602 may be a non-removable memory or a removable memory. In addition, as an example, the peripheral device 1601 may include a display, GPS or other peripherals and is not limited to the above-described embodiment.

In addition, as an example, like the transceiver 1604, the above-described device 1600 may include a communication circuit. Based on this, the device 1600 may perform communication with an external device.

In addition, as an example, the processor 1603 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1600. In addition, the processor 1603 may be performed by modularizing the functions of the controller 430 of FIG. 4.

Herein, the processor 1603 may execute computer-executable commands stored in the memory 1602 in order to implement various necessary functions of the signal synchronization device. As an example, the processor 1603 may control at least any one operation among signal coding, data processing, power controlling, input and output processing, and communication operation. In addition, the processor 1603 may control a physical layer, an MAC layer and an application layer. In addition, as an example, the processor 1603 may execute an authentication and security procedure in an access layer and/or an application layer but is not limited to the above-described embodiment.

In addition, as an example, the processor 1603 may perform communication with other devices via the transceiver 1604. As an example, the processor 1603 may execute computer-executable commands so that the signal synchronization device may be controlled to perform communication with other devices via a network. That is, communication performed in the present invention may be controlled. As an example, the transceiver 1604 may send a RF signal through an antenna and may send a signal based on various communication networks.

In addition, as an example, MIMO technology and beam forming technology may be applied as antenna technology but are not limited to the above-described embodiment. In addition, a signal transmitted and received through the transceiver 1604 may be controlled by the processor 1603 by being modulated and demodulated, which is not limited to the above-described embodiment.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for synchronizing a signal, the method comprising:
receiving a reference time and performing time synchronization with the reference time;
calculating a clock frequency of a system clock based on the reference time; and
generating a sampling clock by using the calculated clock frequency of the system clock and a preset sampling frequency,
wherein the performing of the time synchronization performs the time synchronization by receiving, from a master device, a time of the master device as the reference time, and
wherein the calculating of the clock frequency of the system clock calculates, based on a preset unit time interval, a clock number of the system clock in the unit time interval and calculates the clock frequency of the system clock by using the calculated clock number.

2. The method of claim 1, further comprising synchronizing a phase of the generated sampling clock at a preset phase synchronization time point.

3. The method of claim 2, wherein the synchronizing of the phase of the generated sampling clock receives the phase synchronization time point from the master device, which provides the reference time, and synchronizes the phase of the sampling clock at the received phase synchronization time point.

4. The method of claim 2, wherein the synchronizing of the phase of the generated sampling clock synchronizes the phase of the sampling clock through resetting a counter, which generates the sampling clock, at the phase synchronization time point.

5. An apparatus for synchronizing a signal, the apparatus comprising:
a communication unit; and
a controller,
wherein the controller is configured to:
perform time synchronization with a reference time received through the communication unit,
calculate a clock frequency of a system clock based on the reference time, and
generate a sampling clock by using the calculated clock frequency of the system clock and a preset sampling frequency,
wherein the controller is further configured to:
calculate, based on a preset unit time interval, a clock number of the system clock in the unit time interval, and
calculate the clock frequency of the system clock by using the calculated clock number.

6. The apparatus of claim 5, wherein the controller is further configured to synchronize a phase of the generated sampling clock at a preset phase synchronization time point.

7. The apparatus of claim 6, wherein the controller is further configured to:
receive the phase synchronization time point from a master device that provides the reference time, and
synchronize the phase of the sampling clock at the received phase synchronization time point.

8. The apparatus of claim 6, wherein the controller is further configured to synchronize the phase of the sampling clock through resetting a counter, which generates the sampling clock, at the phase synchronization time point.

9. The apparatus of claim 5, wherein the controller is further configured to perform the time synchronization by receiving, from a master device, a time of the master device as the reference time.

10. A system for synchronizing a signal, the system comprising:
a master device configured to provide a reference time; and
a plurality of slave devices,
wherein each of the slave devices is configured to:
perform time synchronization with the reference time received through the master device,
calculate a clock frequency of a system clock based on the reference time, and
generate a sampling clock by using the calculated clock frequency of the system clock and a preset sampling frequency, and
wherein each of the slave devices is further configured to:
calculate, based on a preset unit time interval, a clock number of the system clock in the unit time interval, and
calculate the clock frequency of the system clock by using the calculated clock number.

11. The system of claim 10, wherein each of the slave devices is further configured to synchronize a phase of the generated sampling clock at a preset phase synchronization time point.

12. The system of claim 11, wherein each of the slave devices is further configured to:
receive the phase synchronization time point from the master device that provides the reference time, and
synchronize the phase of the sampling clock at the received phase synchronization time point.

13. The system of claim 11, wherein each of the slave devices is further configured to synchronize the phase of the sampling clock through resetting a counter, which generates the sampling clock, at the phase synchronization time point.

14. The system of claim 10, wherein each of the slave devices is further configured to perform the time synchronization by receiving, from the master device, a time of the master device as the reference time.

* * * * *